June 2, 1953          M. L. EVANS          2,640,905
CYLINDRICAL SANDWICH TOASTER
Filed July 14, 1952
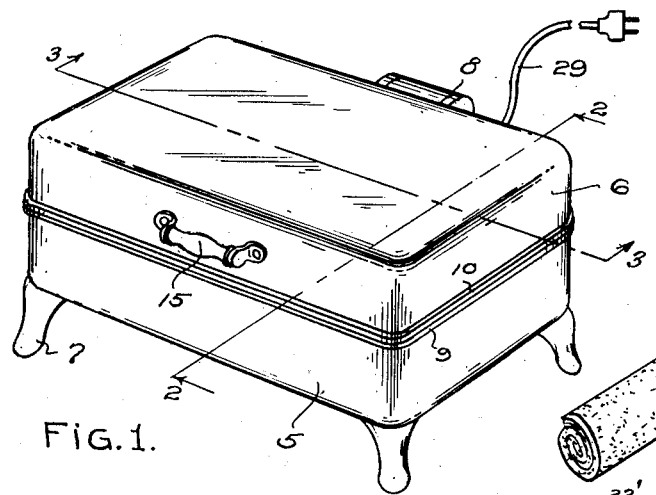
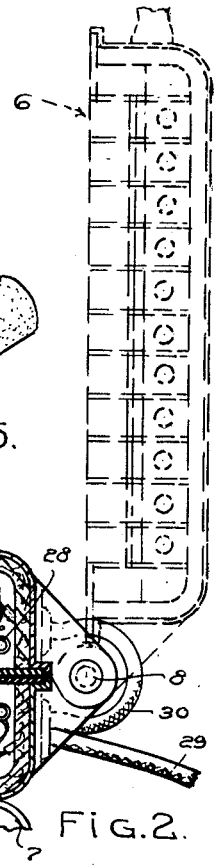
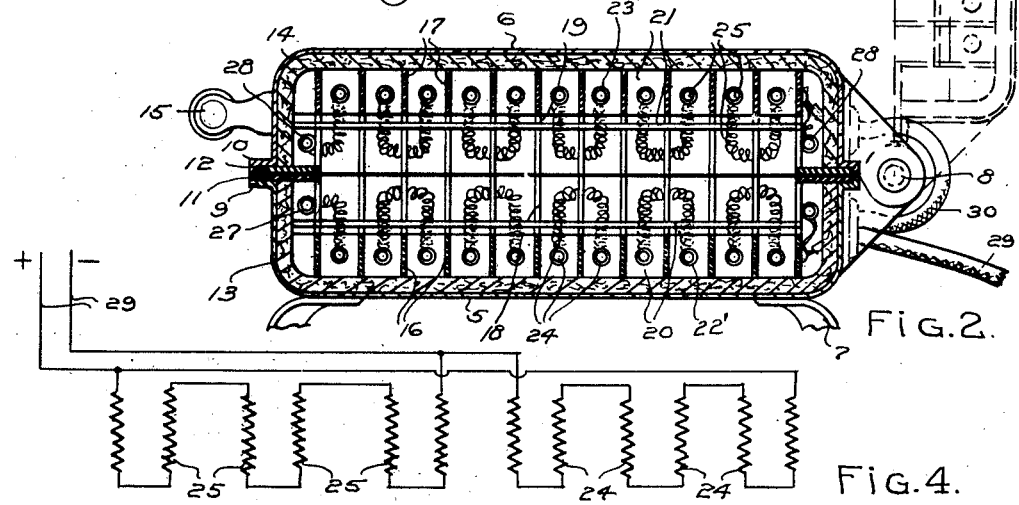
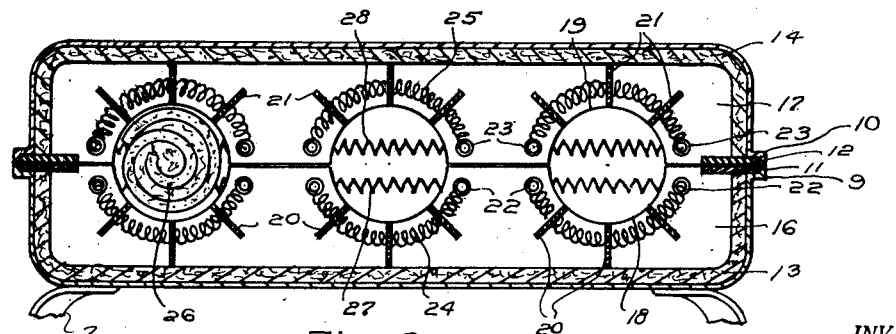
INVENTOR.
MILTON L. EVANS,
BY
ATTORNEY Patented June 2, 1953

2,640,905

UNITED STATES PATENT OFFICE 2,640,905

CYLINDRICAL SANDWICH TOASTER

Milton L. Evans, Miami, Fla.

Application July 14, 1952, Serial No. 298,825

2 Claims. (Cl. 219—19)

This invention relates to an improvement in electrical toasters and has particular reference to a toaster for toasting a novel form of rolled sandwiches.

The toaster of the present invention contemplates a device having upper and lower hinged sections with each section provided with a plurality of semicylindrical trough-like receptacles, with the receptacles of the upper and lower sections mating with each other when the device is closed to form a cylindrical receptacle into which the rolled sandwiches are placed.

The invention further contemplates novel heating elements for the several receptacles.

Detailed structural features and operation of the device will be more clearly understood by reference to the following description, coupled with the attached drawings, wherein has been illustrated a preferred example of the device and wherein like characters of reference are employed to denote like parts throughout the several figures.

In the drawings:

Figure 1 is a perspective view of a toaster constructed in accordance with the invention, Figure 2 is a transverse vertical section taken substantially on line 2—2 of Figure 1, Figure 3 is a longitudinal vertical section taken substantially on line 3—3 of Figure 1, Figure 4 is a diagrammatic wiring diagram for the several heating elements, and Figure 5 is a perspective view of a rolled sandwich of the type to be toasted in the device.

Referring specifically to the drawings, the numeral 5 designates a base unit and 6 an upper unit. The base unit 5 is preferably supported upon leg 7. The upper and lower units are hinged together at 8 whereby the unit 6 may swing in a vertical plane toward and from the unit 5. The units 5 and 6 are of generally rectangular pan shape, provided around their marginal edges with flanges 9 and 10 in which is seated retaining strips 11 and 12. The units 5 and 6 are fully lined with insulation 13 and 14. A handle 15 carried by the upper unit 6 serves to facilitate the swinging of the unit in use.

Each of the units 5 and 6 is provided with a plurality of longitudinally extending partitions 16 and 17. The partitions 16 and 17 are held in position against displacement by the strips 11 and 12. Each of the partitions 16 and 17 are cut away at 18 and 19 to form semicylindrical mating notches that jointly form a cylindrical recess transversely of the toaster when the device is in a closed position.

Each of the partitions 16 and 17 is notched radially from the notches 18 and 19 for the seating reception of transversely disposed and radially arranged partitions 20 and 21. Each of the partitions 16 and 17 is apertured at 22 and 23 while the transverse partitions 20 and 21 are apertured at 22' and 23'. Extending through the several partition apertures are coiled heating elements 24 and 25.

The heating elements 24 and 25 are wound back and forth through the partitions 16 and 17 and arcuately through the partitions 20 and 21 to dispose the elements 24 and 25 in an arcuate manner to conform generally to the notches 18 and 19, thus disposing the heating elements in a manner to radiate their heat over the entire cylindrical surface of the sandwich 26. It is desirable that the ends of the sandwich 26 shall be simultaneously toasted and, to provide for this contingency, end windings 27 and 28 are provided. The several heating elements, as clearly shown, are spaced from direct contact with the sandwich to be toasted. A lead in source of electrical energy 29 is provided for the lower unit 5 while a flexible conductor 30 leads from the lower unit 5 to the upper unit 6 as shown in Figure 2. The several partitions are formed of any desirable semirigid insulating material.

In the use of the device the units are connected with the source of electrical energy and when brought to the proper temperature the unit 6 is swung upwardly to the dotted line position shown in Figure 2 and the rolled sandwiches positioned within the semicylindrical recesses of the lower unit 5. The unit 6 is then swung to closed position and remains closed for a predetermined length of time to adequately toast the sandwich. The end coils 27 and 28 serve to not only toast the ends of the sandwich but also quickly sear the sandwich filler to maintain the filler in the sandwich against running or dripping from the ends. This is particularly true in sandwiches having filler such as cheese where there is a tendency for the cheese to quickly melt and run from the ends. The sandwiches are preformed with the desired filling and placed within the cylindrical recesses where they are held against any tendency to unroll, and after toasting the sandwich will maintain its rolled shape, providing a very novel and desirable food product. It is contemplated that the sandwich after toasting will be impaled upon a stick that has a head portion designating the particular type of sandwich. It is contemplated that the toaster shall be formed in various sizes with multiple toasting cavities.

It will be apparent from the foregoing that a very novel and highly desirable form of toaster has been provided for the toasting of various rolled sandwiches of the character illustrated. The device is cheap to manufacture, is strong, is durable and is highly efficient for the purposes described. Various other means may be employed to train the heating elements 24 and 25 to conform to the cavities of the toaster.

It is to be understood that the invention is not limited to the precise arrangement shown but that various changes in the shape, size and arrangement of parts shall be made as readily fall within the spirit of the invention or the scope of the subjoined claims.

Having described my invention, what I claim as new and desire to secure by Letters Patent is:

1. A toaster of the character described for evenly toasting the entire outer exposed surface of a rolled sandwich of the type wherein an edible filler is rolled in a slice of bread, that comprises upper and lower identical and mating casing sections hinged at one side whereby the upper section may swing toward and from the lower section, the sections formed open on their mating sides, each of the casing sections provided with a plurality of vertically arranged and equidistantly spaced longitudinally extending parallel partitions, each of the partitions being arcuately notched at equidistantly spaced points with the notches opening toward the open sides of the casings, the notches forming semi-cylindrical cavities in each section and with the cavities of each section having mating relation when the sections are in the closed position to jointly form cylindrical cavities for the reception of a rolled sandwich, the several cavities being closed at their ends, each of the sections provided with a plurality of transverse radially disposed and arcuately arranged partitions that are connected to the longitudinal partitions, the several partitions being apertured for the reception of electrically heated resistance elements, the resistance elements being wound through the several apertures to conform to the semi-circular contour of the cavities, the resistance elements being extended across the opposite ends of each semi-circular cavity, a source of electrical energy connected with the resistance elements of the lower section and an electrical conductor leading from the source of electrical energy of the lower section to the resistance elements of the upper section and means for retaining the several partitions and their supported resistance elements within the casing sections.

2. The structure as recited in claim 1, wherein the arcuate notches of each longitudinal partition are in transverse alignment, the several partitions being formed of insulating material, the inner surface of each casing section being covered with a sheet of heat insulating material.

MILTON L. EVANS.

References Cited in the file of this patent

UNITED STATES PATENTS

| Number | Name | Date |
|---|---|---|
| 1,547,614 | Sawkins | July 28, 1925 |
| 1,678,690 | Connell | July 31, 1928 |
| 1,874,836 | Trenner et al. | Aug. 30, 1932 |
| 1,974,204 | Cooter | Sept. 18, 1934 |
| 2,044,615 | Kennedy | June 16, 1936 |
| 2,197,056 | Nelson | Apr. 16, 1940 |
| 2,329,937 | Orkfritz | Sept. 21, 1943 |